United States Patent
Greathouse et al.

(10) Patent No.: US 9,448,909 B2
(45) Date of Patent: Sep. 20, 2016

(54) RANDOMLY BRANCHING USING PERFORMANCE COUNTERS

(71) Applicant: Advanced Micro Devices, Inc., Sunnyvale, CA (US)

(72) Inventors: Joseph L. Greathouse, Austin, TX (US); David S. Christie, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 361 days.

(21) Appl. No.: 14/054,345

(22) Filed: Oct. 15, 2013

(65) Prior Publication Data

US 2015/0106604 A1 Apr. 16, 2015

(51) Int. Cl.
*G06F 9/30* (2006.01)
*G06F 11/34* (2006.01)
*G06F 11/36* (2006.01)

(52) U.S. Cl.
CPC ........ *G06F 11/3466* (2013.01); *G06F 11/348* (2013.01); *G06F 11/3636* (2013.01); *G06F 11/3409* (2013.01); *G06F 2201/865* (2013.01); *G06F 2201/88* (2013.01)

(58) Field of Classification Search
None
See application file for complete search history.

(56) References Cited

U.S. PATENT DOCUMENTS

| | | | | |
|---|---|---|---|---|
| 5,764,885 A * | 6/1998 | Sites | .................. | G06F 11/3636 712/201 |
| 5,802,272 A * | 9/1998 | Sites | .................. | G06F 11/3466 714/45 |
| 5,838,962 A * | 11/1998 | Larson | .................. | G06F 9/3844 712/239 |
| 5,909,578 A * | 6/1999 | Buzbee | ............... | G06F 11/3466 714/E11.2 |
| 5,913,043 A | 6/1999 | Carter et al. | | |
| 5,944,841 A * | 8/1999 | Christie | ............. | G06F 11/3466 714/38.11 |
| 6,205,545 B1 * | 3/2001 | Shah | ..................... | G06F 9/3802 712/237 |
| 6,233,531 B1 | 5/2001 | Klassen et al. | | |
| 6,728,949 B1 * | 4/2004 | Bryant | ............... | G06F 11/3409 712/233 |
| 7,292,957 B1 * | 11/2007 | Schell | ................. | G06F 11/3419 702/182 |
| 7,526,757 B2 * | 4/2009 | Levine | ............... | G06F 11/3636 717/127 |
| 7,814,466 B2 * | 10/2010 | Chen | .................... | G06F 11/3466 712/227 |
| 8,051,332 B2 * | 11/2011 | Zakonov | ............. | G06F 11/3409 714/38.1 |
| 8,214,819 B2 * | 7/2012 | Mosberger | .......... | G06F 11/3409 717/130 |

(Continued)

OTHER PUBLICATIONS

'Modern Microprocessors—A 90 Minute Guide!' by Patterson, archived version from Aug. 2012.*

(Continued)

*Primary Examiner* — Steven Snyder
(74) *Attorney, Agent, or Firm* — Rory D. Rankin; Meyertons, Hood, Kivlin, Kowert & Goetzel, P.C.

(57) ABSTRACT

A system and method for efficiently performing program instrumentation. A processor processes instructions stored in a memory. When the processor processes a given instruction of a given instruction type, the processor updates a corresponding performance counter. When the performance counter reaches a threshold, the processor generates an interrupt and compares a location of the given instruction with stored locations in a given list. If a match is not found, then the processor processes an instruction following the given instruction in the computer program without processing intermediate instrumentation code. If a match is found, then the processor processes instrumentation code. Regardless of whether or not the instrumentation code is processed, when control flow returns to the computer program, the corresponding performance counter is initialized with a random value.

18 Claims, 3 Drawing Sheets

(56) References Cited

U.S. PATENT DOCUMENTS

| | | | | |
|---|---|---|---|---|
| 8,245,199 B2* | 8/2012 | Chen | ............ | G06F 11/3466 717/130 |
| 8,479,052 B2* | 7/2013 | Zakonov | ............ | G06F 11/3409 714/38.1 |
| 8,839,041 B2* | 9/2014 | Zakonov | ............ | G06F 11/3409 714/38.1 |
| 2007/0079294 A1* | 4/2007 | Knight | ............ | G06F 9/30003 717/130 |
| 2007/0226703 A1* | 9/2007 | Sharapov | ............ | G06F 12/0862 717/131 |
| 2007/0260849 A1* | 11/2007 | Chen | ............ | G06F 9/5044 712/34 |
| 2007/0260860 A1* | 11/2007 | Chen | ............ | G06F 11/3466 712/227 |
| 2007/0261033 A1* | 11/2007 | Chen | ............ | G06F 11/3466 717/130 |
| 2007/0261034 A1* | 11/2007 | Chen | ............ | G06F 11/3466 717/130 |
| 2010/0037101 A1* | 2/2010 | Zakonov | ............ | G06F 11/3409 714/38.1 |
| 2012/0011491 A1* | 1/2012 | Eldar | ............ | G06F 11/3612 717/130 |
| 2013/0247008 A1* | 9/2013 | Mitran | ............ | G06F 9/30058 717/130 |

OTHER PUBLICATIONS

Drongowski, Paul J., "Instruction-Based Sampling: A New Performance Analysis Technique for AMD Family 10h Processors", Advanced Micro Devices, Inc., Nov. 16, 2007, 14 pages.

Lee, et al., "Branch-on-Random", Proceedings of the 6th Annual IEEE/ACM International Symposium on Code Generation and Optimization, Apr. 5-10, 2008, 10 pages, ACM, New York, NY, USA.

Dean, et al., "ProfileMe: Hardware Support for Instruction-Level Profiling on Out-of-Order Processors", MICRO 30 Proceedings of the 30th Annual ACM/IEEE International Symposium on Microarchitecture, Dec. 1-3, 1997, 12 pages, IEEE Computer Society, Washington, DC, USA.

* cited by examiner

RANDOMLY BRANCHING USING PERFORMANCE COUNTERS

BACKGROUND

1. Field of the Invention

This invention relates to high performance computing systems, and more particularly, to efficiently performing program instrumentation.

2. Background

An understanding of the dynamic behavior of software applications allows software programmers to write the applications in both an efficient and a high-performance manner. For this reason, software programmers at times add additional code to developing applications. The additional code may include instrumentation code and analysis code that communicates statistics and other information about the behavior of the application as it is processed. Patterns and particular events may be identified and characterized. However, as both the speed and the functionality of processors increase, it has become more difficult to collect information about the dynamic behavior of the applications.

The collection of information about application dynamic behavior may include a large number of trace instructions, a large amount of statistics, and an appreciable amount of overhead to perform the collection. The additional code may reduce the execution time of an application by an order of magnitude. A computer or server may run particular code for hours to test all major code paths. Straightforward instrumentation may increase the run time to days or even weeks.

Due to the problems identified above, the instrumentation and analysis code may be sampled to reduce the drawbacks of collecting dynamic behavior information. A relatively small percentage of the dynamically encountered instrumentation code is actually executed. The selection of when to execute the dynamically encountered instrumentation code may be performed in a random manner. Unfortunately, the selection process for performing the sampling decisions consumes an appreciable amount of time and cost.

Generating and comparing random numbers in software is non-trivial. Similarly, moving the sampling decisions to hardware consumes on-die real estate as circuitry is added to perform random number generation and connecting the results to other parts of the processor. Additionally, new instructions may be added to the instruction set architecture (ISA) to offer support, which is a non-trivial effort. Another approach may include using hardware to randomly tag an instruction and gather microarchitecture-level information about the processing of the tagged instruction. However, such an approach utilizes hard-coded analysis in the processor, rather than user-defined custom instrumentation code. Further, such an approach analyzes a single instruction versus multiple instructions of a software-based approach.

In view of the above, efficient methods and systems for efficiently performing program instrumentation are desired.

SUMMARY OF EMBODIMENTS

Systems and methods for efficiently performing program instrumentation are contemplated. In various embodiments, a computing system includes a memory for storing instructions of a computer program and a processor for processing the stored instructions. When the processor processes a given instruction type, the processor may update a corresponding performance counter. If a stored value in the performance counter reaches a threshold, then the processor may generate an interrupt.

Instructions in an interrupt handler may compare a location of the instruction of the given instruction type with stored locations in a given list. The stored locations may correspond to locations in the computer program of a "random branch" instruction. Each "random branch" instruction may have a same instruction type as the given instruction type. If a match is not found, then the processor transfers control flow back to the computer program and processes an instruction following the instruction with the given instruction type in program order without processing intermediate instrumentation code. If a match is found, then the processor maintains control flow in the interrupt handler and processes instrumentation code in place of the computer program. Regardless of whether or not the instrumentation code is processed, when control flow returns to the computer program, the corresponding performance counter may be initialized with a random value.

These and other embodiments will be further appreciated upon reference to the following description and drawings.

Figure 1:
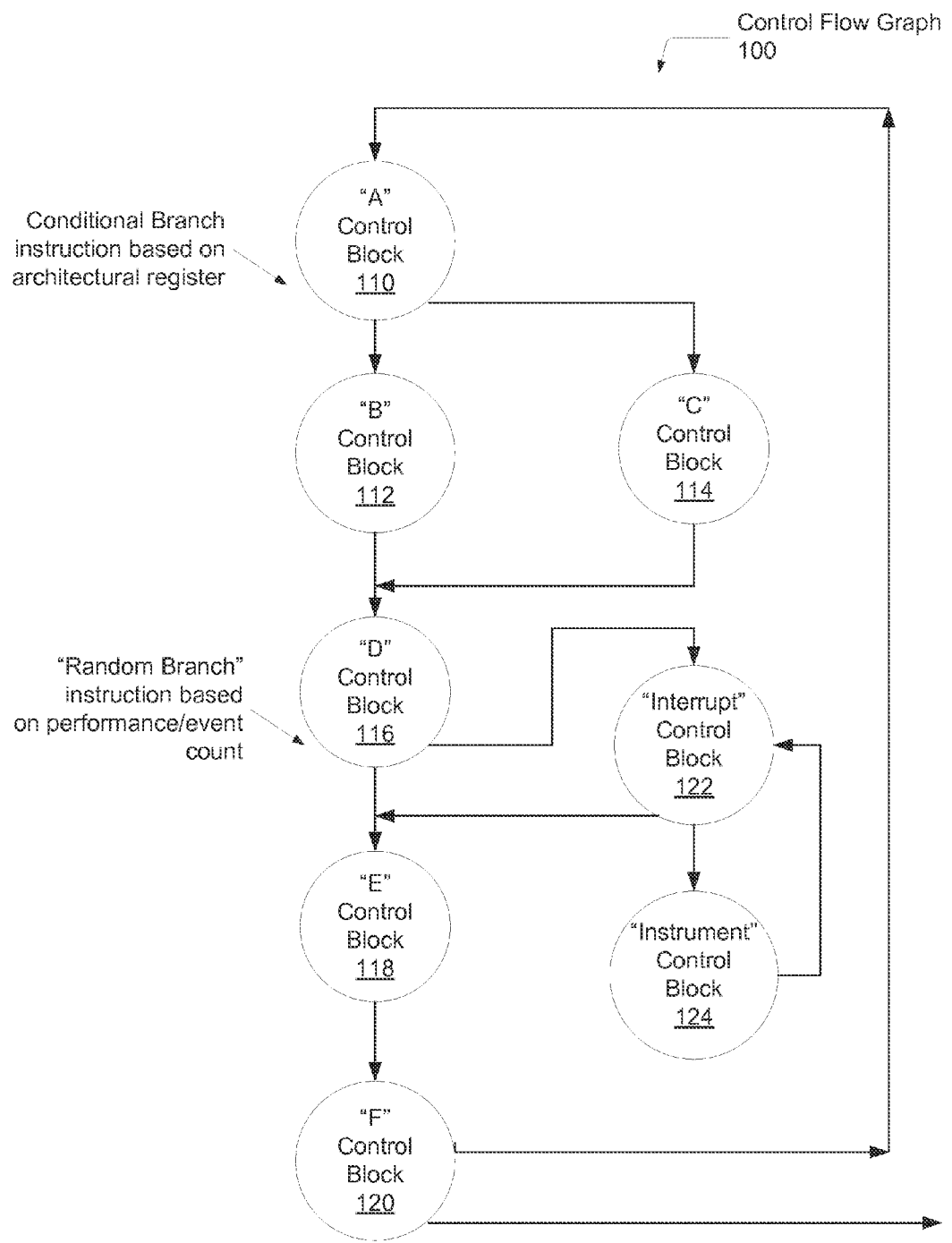
FIG. 1 is a generalized block diagram of one embodiment of a control flow graph.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENT(S)

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

Referring to FIG. 1, one embodiment of a control flow graph 100 is shown. Control blocks 110-124 represent control blocks within a software application or a subroutine. The arrows represent paths. The control flow graph 100 may represent a complete graph or a section of a larger control flow graph. Control block 110, or Block A for simpler demonstration, may represent an entry-point-control-block. Control block 122, or Block F for simpler demonstration, may represent an exit-point-control-block. Alternatively, Blocks A and F may connect to other control blocks not shown and the entry-point-control-block(s) and exit-point-control-block(s) are located elsewhere in a larger control flow graph.

The control blocks (CBs) A and D may represent multiple exit-point-control-blocks. For example, a path exiting CB A may go to CB B or go to CB C. A control flow instruction at the end of CB A may cause a path to CB B to be taken rather than a path to CB C. Alternatively, during another iteration, the control flow instruction at the end of CB A may cause a path to CB C to be taken rather than a path to CB B. Although not shown, the control flow graph (CFG) 100 may include multiple entry-point-control-blocks.

The control flow instruction at the end of CB A may be dependent on a value stored in a particular architectural register. An identifier of the particular architectural register may be specified in the instruction. The control flow instruction at the end of CB A may include one of a conditional branch instruction, an indirect jump instruction, and so forth.

Paths within the CFG 100 are listed in program sequence order. One path within the CFG 100 may be represented by control blocks (CBs) A, B, D, E and F. Here, the exit of CB A goes along the path to CB B. A second path may be represented by CBs A, C, D, E and F. Here, the exit of CB A goes along the path to CB C. A third path within the CFG 100 may be represented by CBs A, B, C, D, Interrupt, Instrument, Interrupt and F. Similar to CB A, the CB D has multiple exit points. For example, a path exiting CB D may go to CB E or go to CB Interrupt. The occurrence of a predetermined instruction at the end of CB D may cause a path to CB E to be taken rather than a path to CB Interrupt. Alternatively, during another iteration, the occurrence of the predetermined instruction at the end of CB D may cause a path to CB Interrupt to be taken rather than a path to CB E.

Unlike the control flow instruction at the end of CB A, the predetermined instruction in CB D may not be a control flow instruction. The predetermined instruction in CB D may not include a condition to test in order to cause a selection of a path in CFG 100 to take. Rather, the occurrence of the predetermined instruction may trigger the selection logic.

The predetermined instruction may not update architecture state, such as an update of an architectural register in a register file, when processed. One example of the predetermined instruction is a prefetch instruction. A complete set of information for the architecture state may include information saved and restored when software threads are switched in a processor core. Generally, retirement logic within a processor core may receive a completion status of an instruction at the end of a pipeline and may process the results so that the corresponding architecture state is retired (or committed) in program order. Processing prefetch instructions does not update the architecture. Rather, processing prefetch instructions loads data predicted to be used into a data cache.

Pre-existing performance counters and corresponding logic may be set to detect the occurrence of the predetermined instruction, such as prefetch operations. The pre-existing performance counter hardware may detect and count a number of occurrences of the predetermined instruction, such as prefetch operations, during execution of the software application. As shown in the CFG 100, the predetermined instruction is located at least at the end of the CB D. However, the predetermined instruction may also occur in other locations both within the CFG 100 and in other areas of the software application outside of the CFG 100.

An interrupt handler may utilize a pseudorandom algorithm to provide a random value and set the random value in a predetermined performance counter. As used herein, a "random" value refers to a value provided by a pseudorandom algorithm. When the predetermined performance counter reaches a threshold, an interrupt may be generated. For example, a random value may be loaded into the predetermined performance counter and the counter increments upon each detection of the predetermined instruction. When the predetermined performance counter rolls over from a maximum value to zero, a corresponding interrupt may be generated. Processing within a corresponding processor may be interrupted and control flow may be sent to the interrupt handler, which is represented as CB Interrupt in CFG 100. By setting an initial value stored in the predetermined performance counter, it is possible to control how many events occur before a corresponding interrupt may be generated. Since the initial value may be a random number, the generation of the corresponding interrupt is randomized.

Based on both an occurrence of the predetermined instruction at the end of CB D and a randomized count reaching a threshold, an interrupt is generated. Based on further conditions, the corresponding interrupt handler may transfer control flow of the processing of the program code to process other instructions rather than fall-through instructions in the program code. For example, the control flow may be transferred from CB D to CB Interrupt to CB Instrument, rather than from CB D to CB E. Therefore, a "random branch" is created at the location of the predetermined instruction in the program code.

The change in the control flow causes the predetermined instruction to behave as a "random branch" instruction. However, other locations within the program code where the predetermined instruction occurs may not be a "random branch". A software programmer may have placed the predetermined instruction at the end of CB D in order to create the "random branch", rather than execute an actual instruction, such as a prefetch operation. Therefore, the software programmer may predetermine particular interrupts may be taken at selected locations within the program code.

The interrupt handler represented by CB Interrupt in block 122 may hold a list of locations within the program code where the predetermined instruction represents a "random branch" instruction. For example, a prefetch operation at the end of CB D may represent a "random branch", but a prefetch operation located within CB B may not represent a "random branch". The code within the interrupt handler may filter legitimate uses of a "random branch" by comparing a current location of an occurrence of the prefetch operation to predetermined stored locations where the predetermined instruction represents a "random branch" instruction. The interrupt handler may store the predetermined locations in a data structure, a table, a list, and so forth. A list may be used in the description for illustrative purposes.

The code within the interrupt handler in CB Interrupt may compare a current location in the CFG 100 where both the prefetch operation at the end of CB D occurs and where the interrupt was generated to the stored locations. If a match is found, then the interrupt handler may transfer control flow to user-defined instrumentation code, such as the code represented by CB Instrument in block 124. If a match is not found, then the interrupt handler may reset the predetermined performance counter to a random value and transfer control back to the program code, such as to CB E. Therefore, an instruction following the prefetched operation in program order may be retired without any intermediate instrumentation code being executed. The intermediate instruction code may be the user-defined instrumentation code, such as the code represented by CB Instrument in block 124.

The code in the CB Instrument may include code to generate traces. In addition the instrumentation code in the CB Interrupt may monitor and collect information for a variety of multiple instruction types regarding branch prediction techniques, cache memory subsystem modeling, fault tolerance studies, memory access patterns and memory leaks, loop iterations, inter-procedural paths, and so forth.

The instrumentation code collects information about a plurality of instructions in the computer program. When the instrumentation code completes, control flow may transfer back to the CB Interrupt. The interrupt handler may reset the predetermined performance counter to a random value and transfer control back to the program code, such as to CB E.

Figure 2:
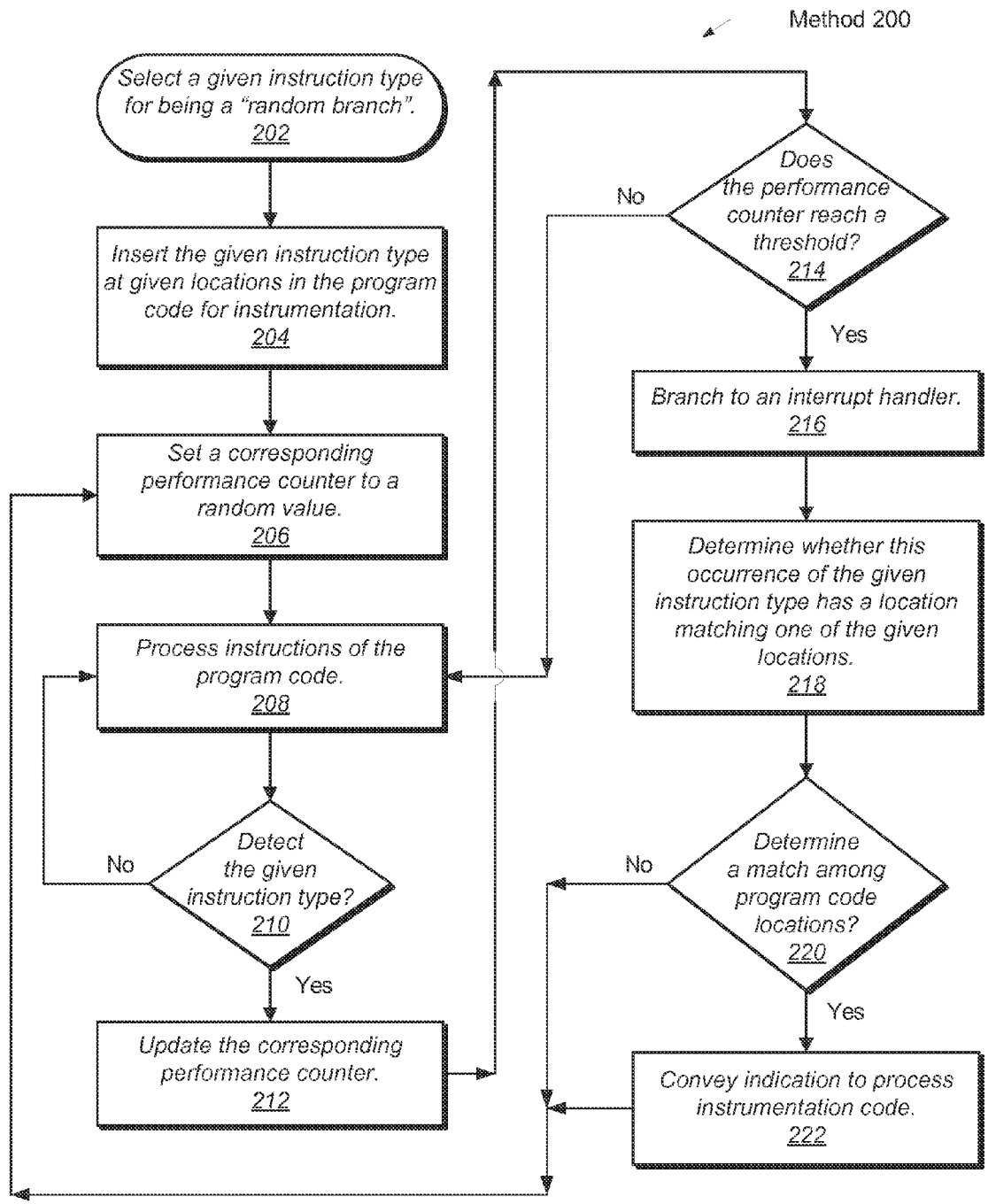
FIG. 2 is a generalized flow diagram of one embodiment of a method for efficiently performing program instrumentation.

Turning now to FIG. 2, one embodiment of a method 200 for efficient memory access instruction instrumentation is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 202, a given instruction type is selected for being a "random branch" in program code. The given instruction may not update architecture state, such as an update of an architectural register in a register file, when processed. A complete set of information for the architecture state may include information saved and restored when software threads are switched in a processor core. One example of the given instruction is a prefetch operation. This read or load operation may be used to access instructions or data before the fetched information is ready to be used by the processor.

In block 204, the given instruction type may be inserted in given locations in the program code for instrumentation to occur. A software programmer may select the type of instrumentation and analysis to perform and select the locations in the program code to optimize the analysis and collection of information. The given instruction type may be inserted in the program code at these selected locations.

In block 206, a pre-existing performance counter in a processor is selected for monitoring events for initiating instrumentation. In addition, the performance counter is loaded with a random value. In block 208, the instructions in the program code are processed. The instructions may be fetched and decoded, source and destination registers may be renamed, and the instructions may be executed and retired. One or more processor cores may be used for processing the instructions of the program code.

Control logic associated with the performance counter may monitor and detect instruction types in a given pipeline stage. For example, the given pipeline stage may be a stage prior to a commit pipeline stage in a processor. Alternatively, the given pipeline stage may be the commit pipeline stage. If the selected instruction type is detected in the given pipeline stage (conditional block 210), then in block 212, the performance counter is updated. For example, the performance counter may be incremented.

Control logic may compare the value stored in the performance counter to a threshold. For example, the performance counter may roll over from a maximum value to zero. If the value stored in the performance counter reaches a threshold (conditional block 214), then in block 216, control flow of the program code transfers to an interrupt handler. In block 218, logic within the interrupt handler determines whether this occurrence of the given instruction type has a location matching one of the previously selected locations in the program code. For example, portions or all of a program counter (PC) value may be compared. Alternatively, offset values may be used.

If a match is found between the location of the current instruction type and one of the stored previously selected locations (conditional lock 220), then in block 222, an indication may be conveyed to process instrumentation code. For example, the interrupt handler may transfer control flow to user-defined custom instrumentation code. When the instrumentation and analysis code completes, control flow may return to the interrupt handler. The interrupt handler may reset the performance counter to another random value. Afterward, control flow may be transferred back to the program code at a location following the given instruction type.

Figure 3:
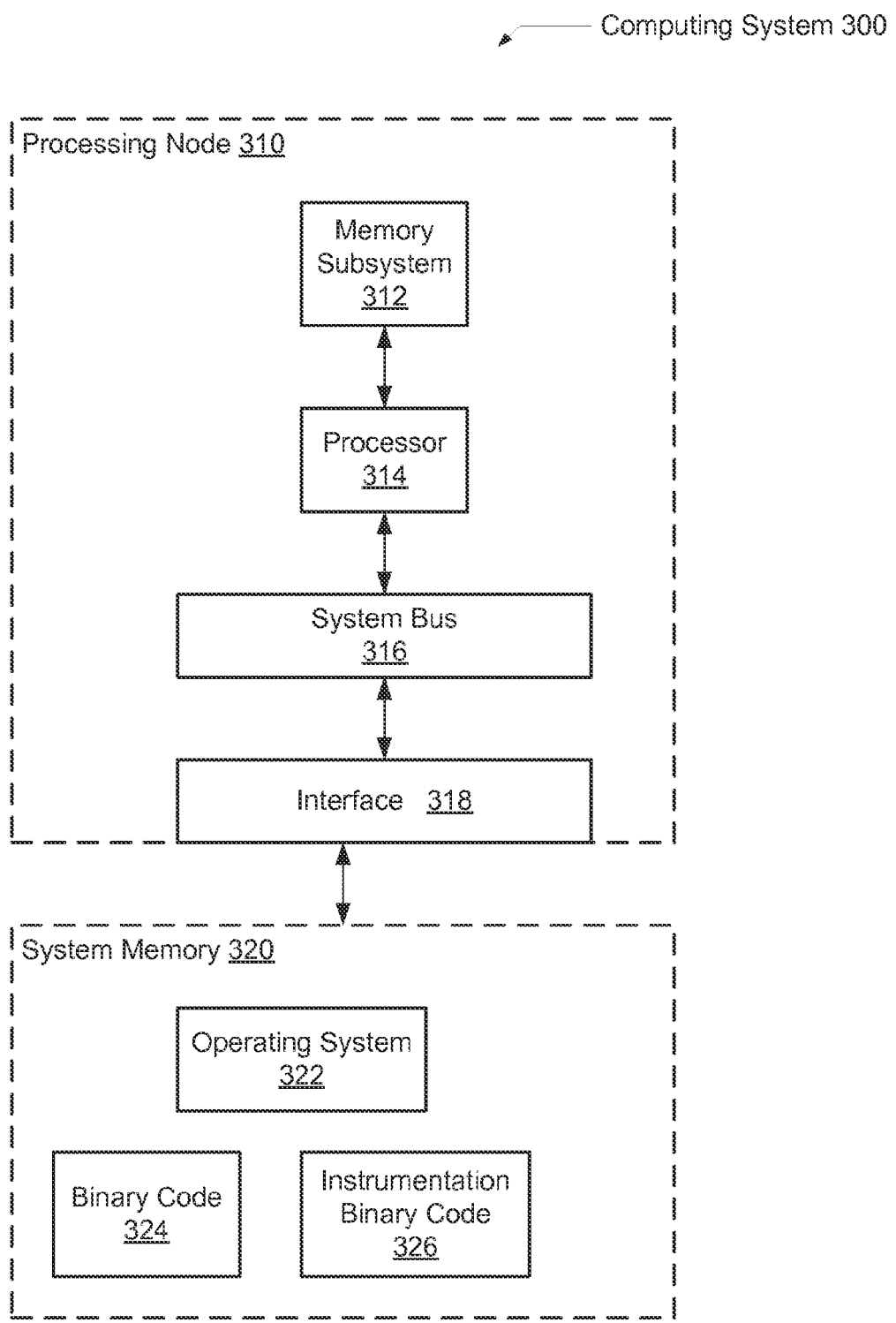
FIG. 3 is a generalized block diagram of one embodiment of a computing system.

Turning now to FIG. 3, a generalized block diagram illustrating one embodiment of a computing system 300 is shown. As shown, the computing system 300 includes processing node 310 and system memory 320. In various embodiments, the processing node 310 includes a system bus 316, a processor 314, and a memory subsystem 312. Additionally, the processing node 310 may include the interface 318 for connecting to input/output (I/O) peripheral devices, to the system memory 320 and to other systems. Although a single processor 314 is shown, the processing node 310 may include multiple processors, each with one or more processor cores. The multiple processors may be homogenous or heterogeneous microarchitecture designs.

The system memory 320 may include at least an operating system (OS) 322, binary code 324 corresponding to a software application, and instrumentation binary code 326. The OS 322 may generally manage the operation of the hardware in the processing node 310, which relieves application programs from having to manage details such as allocating regions of memory for a software application. The multiple processes of a compiled software application may require its own resources such as an image of memory, or an instance of instructions and data before application execution. Each process may comprise process-specific information such as address space that addresses the code, data, and possibly a heap and a stack; variables in data and control registers such as stack pointers, general and floating-point registers, program counter, and otherwise; and operating system descriptors such as stdin, stdout, and otherwise, and security attributes such as processor owner and the process' set of permissions.

The binary code 324 may include compiled instructions of a software application developed by a software programmer. Additionally, the instrumentation binary code 326 may include compiled instructions of instrumentation code developed by the software programmer. Copies of portions of both the binary code 324 and the instrumentation binary code 326 may also be stored in one or more levels of a cache subsystem within the memory subsystem 312.

The binary instrumentation of code may be performed statically or dynamically. For either manner, both data flow and control flow analyses are performed to yield a data flow graph and a control flow graph, respectively. For dynamic instrumentation, the loading and executing of object code and instrumentation object code may occur in response to generated interrupts. The interrupts may be generated based on a number of occurrences of a given instruction type. Instrumentation libraries and tools may be used to create the instrumentation binary code 326.

The instrumentation binary code 326 may be used to provide statistics for performance studies or debugging techniques. When control flow is transferred from the software application algorithm used in the binary code 324 to the algorithms in the instrumentation binary code 326, program characteristic information may be relayed by the analysis routines to other software analysis units, which may determine errors and performance during execution. Alternatively, the program characteristic information is conveyed to storage for later analysis and inspection.

The processing node 310 may include one of various computing products such as a desktop computer, a server, a tablet computer, a laptop computer, and so forth. For ease of illustration, the computing system 300 does not include all examples of functional blocks, control logic, and interfaces required both within and outside the computer system 110.

In various embodiments, the illustrated functionality of the processing node 310 is incorporated upon a single integrated circuit. In other embodiments, the illustrated functionality of the processing node 310 may be provided on a system-on-chip (SOC), on separate semiconductor chips on a motherboard or card, or other. Although a single processor 314 is shown, the processing node 310 may include multiple processors. The other processors may include a graphics processing unit (GPU), another type of single-instruction-multiple-data (SIMD) core, a digital signal processor (DSP), an application-specific integrated circuit (ASIC), other general-purpose processors, and so forth. The processor 114 may include multiple processor cores. Each processor core may include circuitry for executing instructions according to a predefined instruction set. For example, the x86® instruction set architecture (ISA) may be selected. Alternatively, the x86-64®, Alpha®, PowerPC®, MIPS®, SPARC®, PA-RISC®, or any other instruction set architecture may be selected.

Generally speaking, the processor 114 accesses memory storage for data and instructions or commands. In some embodiments, a cache memory subsystem implemented as a L1 cache structure configured to store blocks of data, and possibly with an additional L2 cache structure, is integrated within the processor 114. Memory subsystem 312 may be implemented as a L2 or L3 cache structure and may be directly coupled to the processor 314. If a requested block is not found in an integrated cache structure or memory subsystem 312, then a read request may be generated and transmitted to a memory controller in order to access outside memory to which the missing block is mapped. The functionality of a memory controller may be included in the interface 318.

The interface 318 may follow memory channel protocols for determining values used for information transfer, such as a number of data transfers per clock cycle, signal voltage levels, signal timings, signal and clock phases and clock frequencies. Additionally, memory controller 120 may include request queues for queuing memory requests. The off-die memory may include one of multiple types of dynamic random access memories (DRAMs). The DRAM may be further connected to lower levels of a memory hierarchy, such as system memory 320, which may be a disk memory.

Any integrated memory within the processor 114, the memory subsystem 112, and any off-die memory may comprise any suitable memory devices in addition to a cache structure. For example, these memories may comprise one or more RAMBUS dynamic random access memories (DRAMs), synchronous DRAMs (SDRAMs), DRAM, static RAM, sequential storage elements such as flip-flops and latches, etc.

The system bus 316 may be configured to respond to control packets received on links to which the processing node 310 is coupled, to generate control packets in response to the processor 314 and/or memory subsystems 312, to generate probe commands and response packets in response to transactions selected by a memory controller not shown, and to route packets through interface logic 318. The interface (IF) 318 may include logic to receive packets and synchronize the packets to an internal clock used by system bus 120. The interface 318 may include buffers and queues for storing packets to be processed or transmitted. The computer system 110 may employ any suitable flow control mechanism for transmitting data.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link.

Additionally, program instructions may comprise behavioral-level description or register-transfer level (RTL) descriptions of the hardware functionality in a high level programming language such as C, or a design language (HDL) such as Verilog, VHDL, or database format such as GDS II stream format (GDSII). In some cases the description may be read by a synthesis tool, which may synthesize the description to produce a netlist comprising a list of gates from a synthesis library. The netlist comprises a set of gates, which also represent the functionality of the hardware comprising the system. The netlist may then be placed and routed to produce a data set describing geometric shapes to be applied to masks. The masks may then be used in various semiconductor fabrication steps to produce a semiconductor circuit or circuits corresponding to the system. Alternatively, the instructions on the computer accessible storage medium may be the netlist (with or without the synthesis library) or the data set, as desired. Additionally, the instructions may be utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a memory configured to store a computer program;
   a processor coupled to the memory, wherein the processor is configured to:
   process instructions of the stored computer program; and
   responsive to at least detecting a predetermined instruction type being processed:

update a count, wherein the count is initialized with a pseudorandom number; and in response to determining the count reaches a threshold, process instrumentation code in place of the computer program, in response to at least determining a program location of the predetermined instruction type matches a location stored in a data structure.

2. The computing system as recited in claim 1, wherein in further response to detecting the predetermined instruction type, the processor is further configured to process an instruction following the predetermined instruction type in program order without processing the instrumentation code, in response to at least determining a program location of the predetermined instruction type does not match any location of one or more locations stored in the data structure.

3. The computing system as recited in claim 2, wherein in response to processing the instrumentation code, the processor is further configured to collect information about a plurality of instructions in the computer program.

4. The computing system as recited in claim 1, wherein the predetermined instruction type is a prefetch instruction for loading data into a data cache.

5. The computing system as recited in claim 1, wherein responsive to at least detecting the predetermined instruction type being processed, the processor is further configured to:
    generate an interrupt; and
    while processing instructions of a handler routine corresponding to the interrupt, compare the program location of the predetermined instruction type to the one or more locations stored in the data structure.

6. The computing system as recited in claim 1, wherein the count is stored in a performance counter.

7. The computing system as recited in claim 1, wherein in response to completing instructions in the instrumentation code, the processor is further configured to reset the count with a pseudorandom number.

8. A method comprising:
    processing instructions of a computer program; and
    responsive to at least detecting a predetermined instruction type in the computer program being processed:
        updating a count, wherein the count is initialized with a pseudorandom number; and
        in response to determining the count reaches a threshold, processing instrumentation code in place of the computer program, in response to at least determining the program location of the predetermined instruction type matches a location stored in a data structure.

9. The method as recited in claim 8, wherein in further response to detecting the predetermined instruction type, the method further comprises processing an instruction following the predetermined instruction type in program order without processing the instrumentation code, in response to at least determining a program location of the predetermined instruction type does not match any location of one or more locations stored in the data structure.

10. The method as recited in claim 9, wherein in response to processing the instrumentation code, the method further comprises collecting information about a plurality of instructions in the computer program.

11. The method as recited in claim 8, wherein the predetermined instruction type is a prefetch instruction for loading data into a data cache.

12. The method as recited in claim 8, wherein responsive to at least detecting the predetermined instruction type being processed, the method further comprises:
    generating an interrupt; and
    while processing instructions of a handler routine corresponding to the interrupt, comparing the program location of the predetermined instruction type to the one or more locations stored in the data structure.

13. The method as recited in claim 8, wherein the count is stored in a performance counter.

14. The method as recited in claim 8, wherein in response to completing instructions in the instrumentation code, the method further comprises resetting the count with a pseudorandom number.

15. A non-transitory computer readable storage medium storing program instructions, wherein the program instructions are executable to:
    process instructions of a computer program; and
    responsive to at least detecting a predetermined instruction type in the computer program being processed:
        update a count, wherein the count is initialized with a pseudorandom number; and
        in response to determining the count reaches a threshold, process instrumentation code in place of the computer program, in response to at least determining the program location of the predetermined instruction type matches a location stored in a data structure.

16. The non-transitory computer readable storage medium as recited in claim 15, wherein in further response to detecting the predetermined instruction type, the program instructions are further executable to process an instruction following the predetermined instruction type in program order without processing the instrumentation code, in response to at least determining a program location of the predetermined instruction type does not match any location of one or more locations stored in the data structure.

17. The non-transitory computer readable storage medium as recited in claim 16, wherein responsive to at least detecting the predetermined instruction type being processed, the program instructions are further executable to:
    generate an interrupt; and
    while processing instructions of a handler routine corresponding to the interrupt, compare the program location of the predetermined instruction type to the one or more locations stored in the data structure.

18. The non-transitory computer readable storage medium as recited in claim 15, wherein the predetermined instruction type is a prefetch instruction for loading data into a data cache.

* * * * *